R. S. HOPKINS.
CAMERA SUPPORT.
APPLICATION FILED MAR. 28, 1916.

1,247,402.

Patented Nov. 20, 1917.
3 SHEETS—SHEET 1.

Inventor
Roy S. Hopkins

By Byrnes Townsend & Brickenstein
Attorney

R. S. HOPKINS.
CAMERA SUPPORT.
APPLICATION FILED MAR. 28, 1916.
1,247,402.
Patented Nov. 20, 1917.
3 SHEETS—SHEET 2.
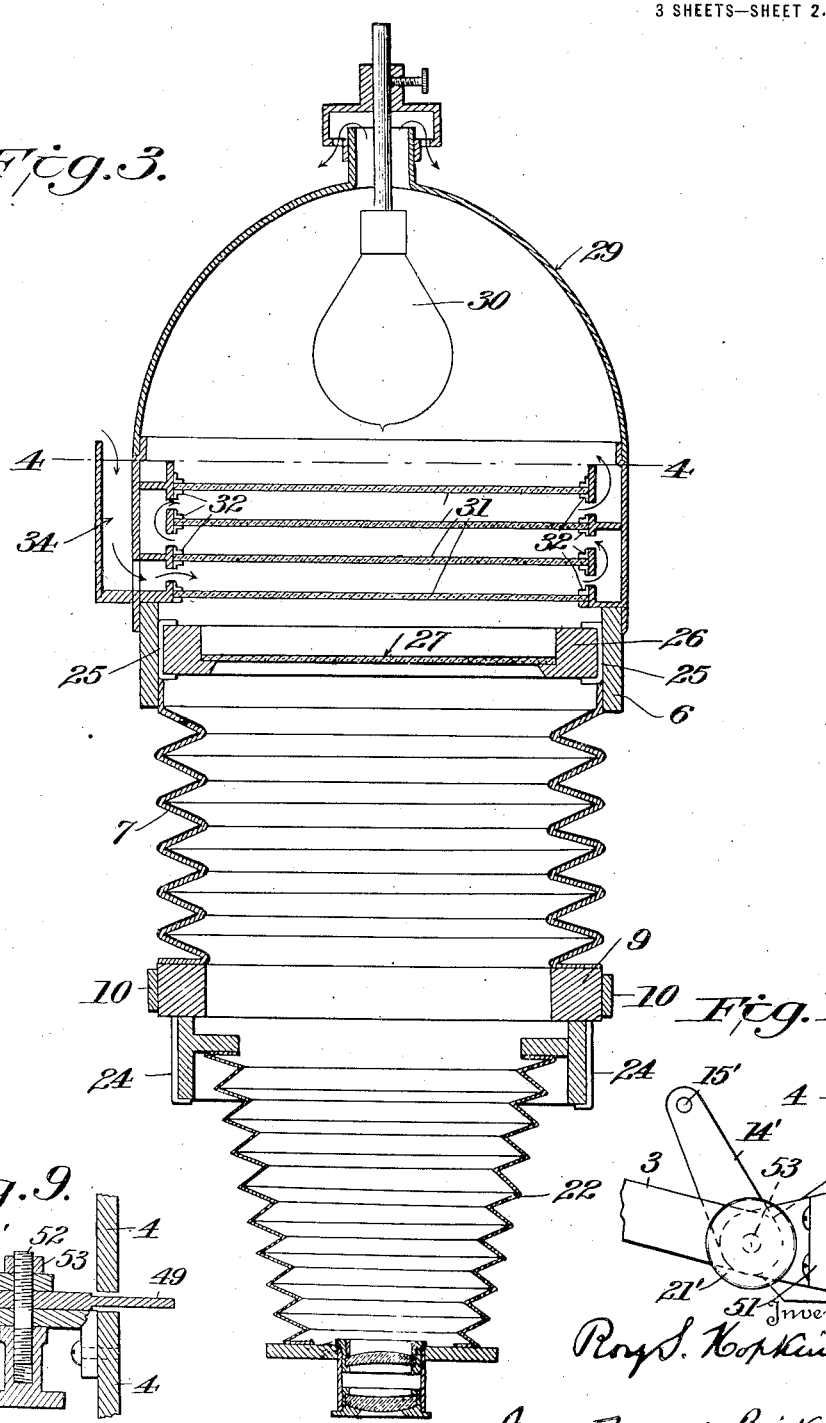
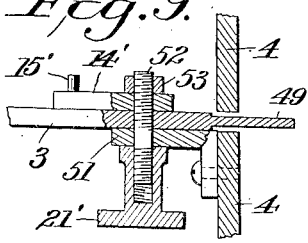
Inventor
Roy S. Hopkins
By Byrnes Townsend Brickenstein
Attorneys R. S. HOPKINS.
CAMERA SUPPORT.
APPLICATION FILED MAR. 28, 1916.
1,247,402.
Patented Nov. 20, 1917.
3 SHEETS—SHEET 3.
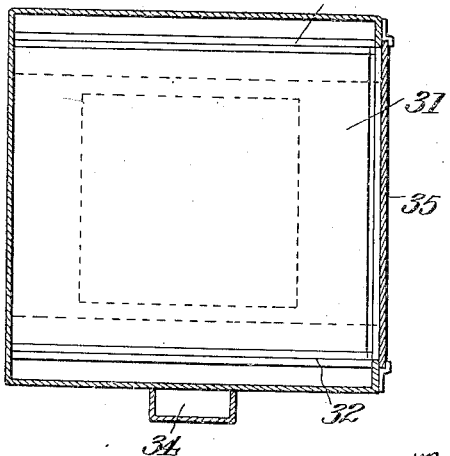
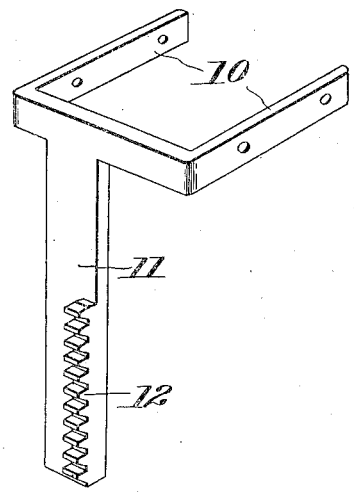
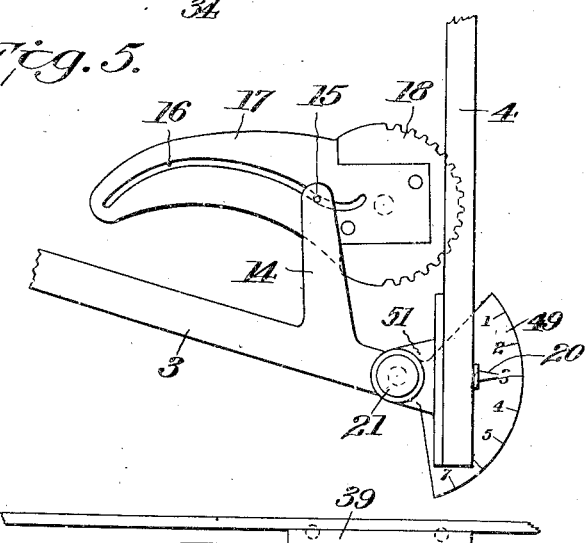
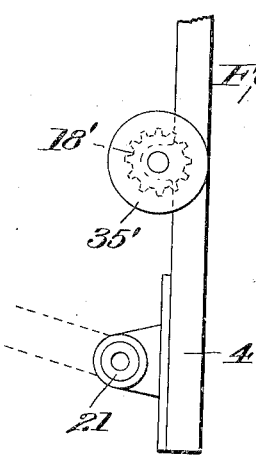
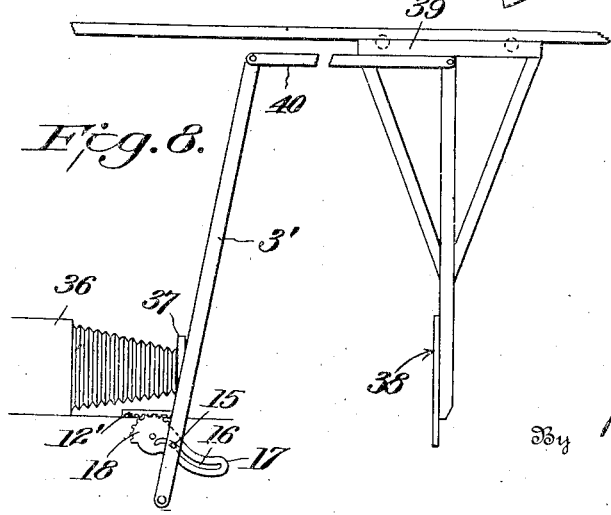
Inventor
Roy S. Hopkins
By Byrnes Townsend & Brickenstein
Attorney

UNITED STATES PATENT OFFICE.

ROY S. HOPKINS, OF WASHINGTON, DISTRICT OF COLUMBIA.

CAMERA-SUPPORT.

1,247,402.

Specification of Letters Patent.

Patented Nov. 20, 1917.

Application filed March 28, 1916. Serial No. 87,277.

*To all whom it may concern:*

Be it known that I, ROY S. HOPKINS, a citizen of the United States, residing at Washington, in the District of Columbia, have invented certain new and useful Improvements in Camera-Supports, of which the following is a specification.

My invention relates to a camera support and to means by which a camera of any usual type may conveniently be used for making enlarged prints. It has for its object to provide a means by which the projected image will be automatically kept in focus, no matter what the degree of enlargement may be. A further object is to so arrange the apparatus that cameras of the constant focus type may be used; to provide an effective means of illumination; and to provide an indicator of the degree of enlargement. Other purposes will appear from the accompanying specification and claims.

In the drawings,—

Fig. 3 is a section on plane 3—3 of Fig. 1;

Fig. 4 is a section on plane 4—4 of Fig. 3;

Fig. 5 is a side elevation of the automatic adjusting means;

Fig. 6 is a detail;

Fig. 7 is a side view of a modification;

Fig. 8 is a side view of the automatic adjusting means as applied to a moving screen;

Fig. 9 is a detail view of a modified form in which the pin-carrying arm is adjustable; and Fig. 10 is a side elevation of Fig. 9.

Figure 1:
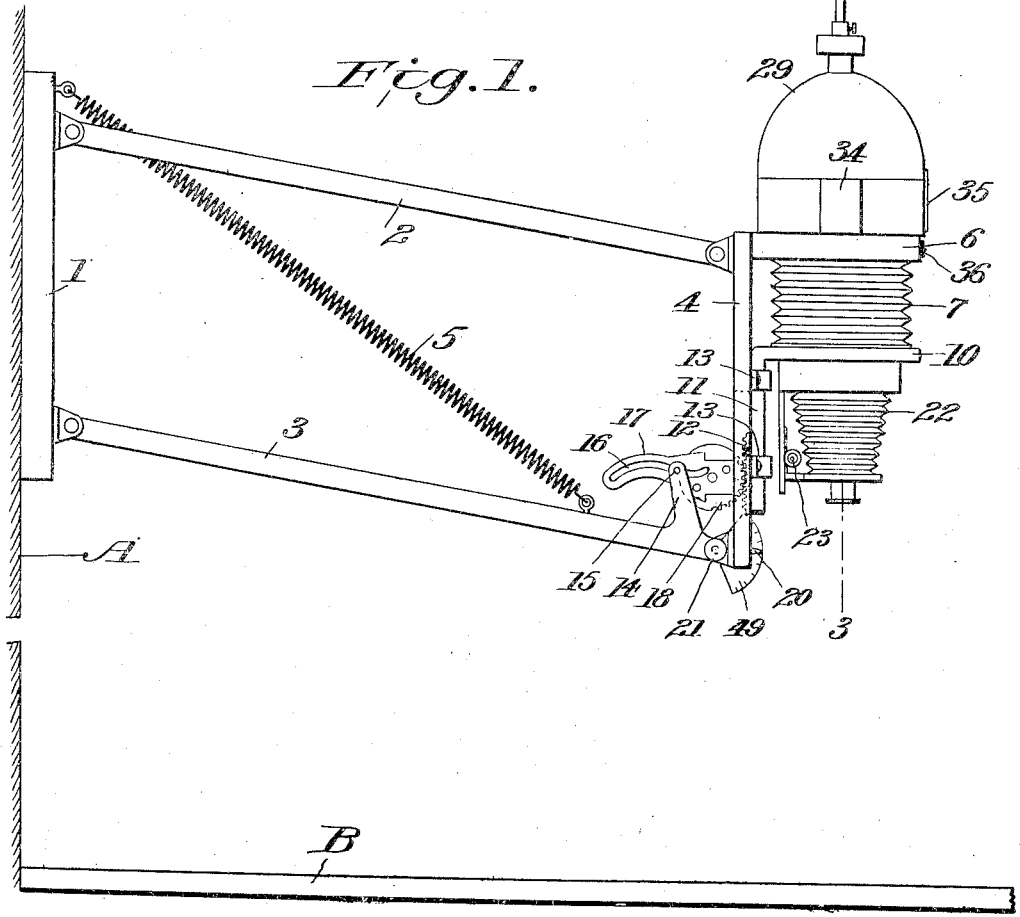
Figure 1 is a side elevation of one form of the device.
Figure 2:
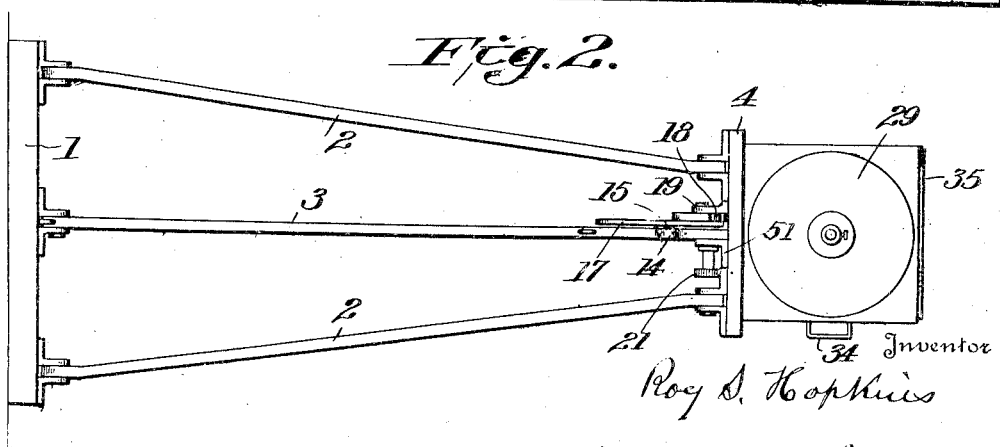
Fig. 2 is a plan view of Fig. 1.

Referring now to Fig. 1, A is the side wall of a room or any other firm vertical support, and B the top of a table or any other horizontal support for the printing paper. To the wall is secured a block 1, on which are pivoted swinging arms 2, 2 and 3. To the outer ends of these arms is pivoted the camera support 4, which is practically counterbalanced by spring 5, so that the whole structure can easily be moved up and down to any desired position.

This block 1 is mounted at a distance above the surface B, dependent upon the focal length of the camera arrangement used.

Rigidly secured to support 4, is a frame 6, which carries a bellows 7, having at its other end a frame 9, Fig. 3, secured to a sliding carrier consisting of arms 10, 10, and a bar 11, having thereon a rack 12. The bar 11 is movably held in guides 13, 13 on support 4.

On the lower arm 3, is an upstanding lug 14 having rigidly secured thereto a pin 15, which engages the walls of a cam slot 16 on an arm 17 secured to a pinion 18, meshing with rack 12. The pinion 18 is journaled in a bracket 19, fastened to support 4. 49 is a scale formed as an extension of arm 3, and 20 is a pointer secured to support 4, the scale being graduated to indicate the degree of enlargement. 21 is a clamping screw by which arm 3 and support 4 are held against relative movement when the desired point of adjustment is reached. 22 is a camera, which may be of any of the types in common use, and may have the usual focusing means 23. As shown in Fig. 3, the camera is held to the frame 9 by clamps 24, which may be of any suitable construction. The frame 6 is provided with guides 25 for receiving a suitable plate-holder 26, having shoulders on which rests the photographic plate 27.

29 is a hood secured to frame 6, and carries at its upper end an electric light 30.

Between the light and the photographic plate are mounted a series of ground-glass plates 31, supported on suitable guides 32. As shown these guides are so arranged that a current of cool outside air may pass between them, this air entering through passage 34 and escaping through an opening in the top of the hood as indicated by the arrows. 35, 36 are doors or slides through which the plates may be introduced.

The operation of the mechanism thus far described is as follows:—

The photographic plate 27 having thereon the picture to be enlarged is inserted into the apparatus, and the light turned on. The focusing screw 23 of the camera is turned to bring the image into focus on the surface B. The apparatus is then moved up and down, the image being projected onto the surface B. This movement changes the relative position of arm 3 and support 4, and the pin 15 moving in the slot 16, causes a rotation of the pinion 18 and a corresponding movement of the rack 12 which moves the camera supporting frame 10. The slot 16 is so curved that the distance through which the camera-lens is moved will be that required to keep the projected image always in focus. In this particular instance the curvature of the cam slot is adapted for a lens having a focal length of five inches.

The operator can thus readily determine, with the projected and always-in-focus image before him on the surface B, just what degree of enlargement is desired, or what portions of the enlarged image he may desire to print.

When the enlarging device has been moved to that point at which the desired result is obtained, the clamp 21 is operated to hold against movement, the arm 3 and support 4, and the print is then made.

The spring 5 enables the device as a whole to be easily moved; and the swinging arms permit the whole arrangement to be swung against the wall or other support A, so that it is out of the way.

This supporting device may be used without the automatic adjustment, in which case I provide a pinion 18' (Fig. 7) operated by a hand-wheel 35' for operating the rack 12. This arrangement will be useful where the camera used has no convenient focusing arrangement. The automatic feature of adjustment is also available for use with enlarging cameras, as shown in Fig. 8, in which 36 is an enlarging camera, in which the lens-carrying frame 37 is secured to a sliding rack 12', gearing with a pinion 18 having an operating arm 17 provided with slot 16, as in the construction previously described. 38 is a screen movable on a carriage 39 to which is pivoted the link 40, which in turn is pivoted to arm 3', carrying pin 15.

The operation of this modified device will be apparent from the foregoing description.

The mounting of the apparatus on swinging arms enables it to be located on the walls of a dark-room or any other room which can be darkened; permits it to be readily swung out of the way; and the parallel motion mounting maintains the camera-carrier with its axis always parallel to the wall or support.

Obviously, the apparatus may be used for copying a picture, as well as for enlarging. In copying, the picture to be copied, suitably illuminated, is placed on the surface B, and for the negative 27 is substituted a sensitized plate or film. As shown in Fig. 9, the lug 14' is adjustably secured to the arm 3, instead of being rigidly fastened thereto. The arm 3 is pivoted to bracket 51 by means of a bolt, 52, threaded into the arm 3, but having a smooth bearing portion engaging the opening in bracket 51. The lug 14' is screwed onto an extension of this bolt and firmly held in adjusted position by nut 53. The other end of this bolt is also screw-threaded and mounted thereon is the clamping nut 21' to hold the arm 3 and support 4 against relative movement.

This capability of adjustment of this pin-carrying lug is desirable, as in adapting the device for lenses of different focal lengths, it will be necessary to use arms 17 having differently curved cam-slots; and there will thus be necessitated a different adjustment of the pin 15.

I have shown the device as adapted for use with a camera. In case it is not desired to use a camera, a suitable lens may be mounted on the frame 9.

My device is of particular advantage in that the image is projected downwardly onto a table or other surface, on which the frame containing the printing paper can readily be moved about, thus obviating the cumbersome and clumsy easels or other supports now in use.

I claim:—

1. An automatic focusing mechanism comprising a swinging lever carrying a camera support, means for causing the camera support to move in parallel planes during the angular movement of the lever, a movable element on the camera support adapted to support an optical element of the camera, and means between the lever and the said movable element for automatically determining its correct position relatively to a fixed point on the camera support and a fixed plane of reference, for all positions of the swinging lever.

2. An automatic focusing mechanism comprising a swinging lever carrying a camera support, means for causing the camera support to move in parallel planes during the angular movement of the lever, a movable element on the lever adapted to support the camera lens and means between the lever and the said movable element for automatically determining the correct position of the lens relatively to a fixed point on the camera support and a fixed plane of reference, for all positions of the swinging lever.

3. An automatic focusing mechanism comprising a swinging lever carrying a camera support, means for holding the camera support in the same angular relationship to a plane of reference, for all positions of the lever, a movable element on the camera support adapted to carry an optical element of a camera, and means responsive to the movement of the lever for automatically shifting the position of the movable element with respect to a fixed point on the camera support to thereby establish the correct position of the said optical element with respect to the said fixed point and the plane of reference.

4. A device for making enlarged photographic prints comprising a camera support having an adjustable camera-carrying device, parallel spaced arms each pivoted at one end to said support, and provided at their other ends with means for attachment to a supporting base, and coöperating means on said support and on one of said arms for adjusting the camera-carrying devices to maintain the proper focus.

5. In a device for making enlarged photographic prints, a camera support, an arm pivoted thereto, an adjustable camera-carrying device on said support having a rack, a gear on said support in mesh with the rack, a cam-slotted arm attached to said gear, and a member attached to said arm having a pin engaging said slot, the slot being so shaped that during relative movement of the arm and support the proper focus will be maintained.

6. In a device for making enlarged photographic prints, a camera support, an arm pivoted thereto, an adjustable camera-carrying device on said support having a rack, a gear on said support in mesh with the rack, and means connected to said arm to rotate said gear to the varying extent required to constantly maintain the focus.

7. In a device for making enlarged photographic prints, a camera support, an arm pivoted thereto, an adjustable camera-carrying device on said support having a rack, a gear on said support in mesh with the rack, means connected to said arm to rotate said gear to the varying extent required to constantly maintain the focus, and a clamp for preventing relative movement of the arm and support.

8. In an enlarging device, a camera support, a frame fixed thereto, a frame adjustable thereon, a bellows between the fixed and movable frames, means for attaching a camera to the movable frame, an illuminating device mounted on said fixed frame, means for supporting a plate in said fixed frame, parallel-motion arms pivoted to the camera support, and means automatically operated by relative movement of said arms and support to adjust said movable frame.

9. In an enlarging device the combination of a print support, an adjustable lens support, a rack connected thereto, a pinion in mesh with the rack and means automatically operated by movement of one of said supports to cause rotation of said pinion to maintain the focus during such movement, said means comprising a cam attached to said pinion and a cam-actuator carried by a moving part of a support.

10. In an enlarging device a movable support, a frame rigid thereon, a frame movable thereon, a bellows connecting the frames, a plate support in the rigid frame, a hood having a light mounted on said rigid frame, and light diffusing means in said hood comprising spaced translucent plates arranged to form an air passage, said hood having an opening connected to said passage, and an opening at its top.

11. In an enlarging device a movable support, a frame rigid thereon, a frame movable thereon, a bellows connecting the frames, a plate support in the rigid frame and means for attaching a camera to said movable frame, a hood having a light mounted on said rigid frame, and light diffusing means in said hood, comprising spaced translucent plates arranged to form an air passage, said hood having an opening connected to said passage, and an opening at its top.

12. An enlarging device comprising a camera device, a swinging support therefor constructed and arranged to move the camera device toward and away from a fixed plane of reference in planes at right angle thereto and means between the swinging support and the camera for automatically adjusting the optical parts of the camera device relatively to the plane of reference to maintain a constant focal relation between the said plane and the camera.

13. An enlarging device comprising a camera device, a swinging support therefor constructed and arranged to move the camera device toward and away from a fixed plane of reference in planes at right angle thereto and means between the swinging support and the camera for automatically adjusting the camera lens relatively to the image plane of the camera and the plane of reference to maintain a constant focal relation therebetween.

14. An enlarging device comprising a camera device, a swinging support therefor constructed and arranged to move the camera device toward and away from a fixed plane of reference in planes at right angle thereto, a relatively movable element for supporting the camera lens, rack mechanism for imparting movement to it and cam mechanism for translating the uniform angular motion of the swinging support into variable motion of the rack mechanism to maintain a constant focal relation between said plane of reference and the image plane of the camera.

15. An enlarging device comprising a camera device, a swinging support therefor constructed and arranged to move the camera device toward and away from a fixed plane of reference in planes at right angle thereto, means between the support and the camera for automatically adjusting a camera element to maintain a constant focal relation between the image plane of the camera and said plane of reference, said means comprising rack mechanism adapted to be connected to the camera element, a pinion in mesh with the rack and a cam element for translating the uniform angular motion of the swinging support into variable rotary motion of the pinion.

In testimony whereof I affix my signature.

ROY S. HOPKINS.